(12) United States Patent
Keeth et al.

(10) Patent No.: US 7,577,212 B2
(45) Date of Patent: Aug. 18, 2009

(54) METHOD AND SYSTEM FOR GENERATING REFERENCE VOLTAGES FOR SIGNAL RECEIVERS

(75) Inventors: Brent Keeth, Boise, ID (US); Joo S. Choi, Boise, ID (US); George E. Pax, Boise, ID (US); Ronnie M. Harrison, Boise, ID (US); David Ovard, Meridian, ID (US); Dragos Dimitriu, Boise, ID (US); Troy A. Manning, Meridian, ID (US); Roy E. Greeff, Boise, ID (US); Greg King, Lakeville, MN (US); Brian Johnson, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 746 days.

(21) Appl. No.: 10/930,543

(22) Filed: Aug. 30, 2004

(65) Prior Publication Data
US 2006/0045206 A1    Mar. 2, 2006

(51) Int. Cl.
*H03K 9/00* (2006.01)

(52) U.S. Cl. .................. 375/316; 375/220; 324/765; 714/25

(58) Field of Classification Search ............. 375/316, 375/220; 324/765; 714/25
See application file for complete search history.

(56) References Cited

U.S. PATENT DOCUMENTS

| | | | |
|---|---|---|---|
| 4,060,834 A | 11/1977 | Mounts et al. | 358/261 |
| 4,433,298 A | 2/1984 | Palm | 324/457 |
| 4,857,725 A | 8/1989 | Goodnough et al. | 250/214 A |
| 4,894,656 A | 1/1990 | Hwang et al. | 341/120 |
| 5,402,666 A | 4/1995 | Chalpin | 73/4 R |
| 5,553,034 A | 9/1996 | Jones et al. | 367/25 |
| 5,898,912 A | 4/1999 | Heck et al. | 455/234.2 |
| 6,046,632 A | 4/2000 | Straw | 330/2 |
| 6,052,026 A | 4/2000 | Tiller et al. | 330/254 |
| 6,160,851 A | 12/2000 | Brown et al. | 375/254 |
| 6,240,100 B1 | 5/2001 | Riordan et al. | 370/442 |
| 6,294,949 B1 * | 9/2001 | Kojima et al. | 327/538 |
| 6,347,287 B1 | 2/2002 | Beckett et al. | 702/89 |
| 6,356,487 B1 * | 3/2002 | Merritt | 365/189.05 |
| 6,546,343 B1 * | 4/2003 | Batra et al. | 702/64 |
| 6,586,964 B1 | 7/2003 | Kent et al. | 326/30 |
| 6,762,617 B2 * | 7/2004 | Iwase et al. | 326/11 |
| 2003/0001667 A1 * | 1/2003 | Casper et al. | 330/9 |
| 2004/0085085 A1 * | 5/2004 | Muhtaroglu et al. | 324/765 |
| 2005/0078530 A1 | 4/2005 | Han | 365/189.05 |
| 2005/0177771 A1 * | 8/2005 | Miller | 714/25 |

* cited by examiner

*Primary Examiner*—Shuwang Liu
*Assistant Examiner*—Kabir A Timory
(74) *Attorney, Agent, or Firm*—Dorsey & Whitney LLP

(57) ABSTRACT

A method and system for generating a reference voltage for memory device signal receivers operates in either a calibration mode or a normal operating mode. In the calibration mode, the magnitude of the reference voltage is incrementally varied, and a digital signal pattern is coupled to the receiver at each reference voltage. An output of the receiver is analyzed to determine if the receiver can accurately pass the signal pattern at each reference voltage level. A range of reference voltages that allow the receiver to accurately pass the signal pattern is recorded, and a final reference voltage is calculated at the approximate midpoint of the range. This final reference voltage is applied to the receiver during normal operation.

28 Claims, 5 Drawing Sheets

METHOD AND SYSTEM FOR GENERATING REFERENCE VOLTAGES FOR SIGNAL RECEIVERS

TECHNICAL FIELD

This invention relates to signal receivers, and, more particularly, to a method and system that generates a reference voltage to which an input signal is compared in a signal receiver in a manner that minimizes the timing skew of the input signal.

BACKGROUND OF THE INVENTION

Digital signals are commonly coupled to and from electronic devices, such as memory devices, at a high rate of speed. The Digital signals are normally coupled to an input buffer or receiver, which generates a digital signal corresponding to the Digital signal applied to the input of the receiver. The timing at which the signal at the output of the receiver changes state is often critically important for timing the relationships within the electronic device. In particular, it is important that the transition of the digital signal not become skewed relative to other digital signals in the electronic device. The difficulty of avoiding signal skew is increased when the digital signals applied to input receivers switch between two voltages that are relatively close to each other.

One technique for preventing the timing of digital signals becoming skewed is to use differential signals, which tend to avoid skewing because of their inherent symmetry even where the voltage between which the signals transition is relatively small. However, some memory bus signaling protocols do not couple differential signals to memory devices. In these devices, the input signal must be compared to a reference voltage to determine the trip point of the receivers. More specifically, when the magnitude of the input signal is greater than the reference voltage, the output of the receiver has a first binary value. When the magnitude of the input signal is less than a reference voltage, the output of the receiver has a second binary value. Ideally, the reference voltage is centered between the two voltages between which the input signal transitions. However, because the input signal may lack symmetry, the ideal reference voltage may be at some other level. In either case, the use of a reference voltage can allow the input receivers to accurately convert digital signals switching within a relatively small voltage range to a receiver output signal that switches within a substantially larger voltage range.

Reference voltages for input receivers are traditionally generated at a single source, and then distributed to each of the input receivers. Distributing the reference voltage in this manner can create a number of problems, all of which can skew the signals generated at the output of the input receivers. For example, noise signals can be coupled to input signal lines from various sources, such as power supply noise and switching noise, may alter the voltages between which the input signal switches. As a result, the reference voltage may no longer be centered between the voltages between which the input signal switches. Furthermore, a lack of symmetry in the input signal can alter the ideal value of the reference voltage. As a result, the signal at the output of the receiver may be skewed, which can lead to degraded timing margins within the memory device.

Not only is it possible for timing skew to result from noise signals to the input signal lines, but timing skew can also result from noise signals coupled to reference voltage distribution lines. The susceptibility of noise signals being coupled to reference voltage distribution lines is exacerbated by the widespread routing of such lines to sometimes hundreds of input receivers at various locations throughout the memory device. Noise can be coupled to these distribution lines through various mechanisms, such as power supply coupling through decoupling capacitors connected to the voltage reference distribution lines. The noise signals can significantly alter the reference voltage at various input receivers thereby altering the voltage of the input signal at which the output of the input receiver switches. The result is a skewing of the output signal, which, as mentioned above, can adversely affect timing relationships within the memory device. Under the circumstances, it may not be possible for the memory device to function properly at high operating speeds.

There is therefore a need for a method and system for generating a reference voltage having an optimum magnitude and for maintaining the reference voltage at that value at the input of each of many input receivers.

SUMMARY OF THE INVENTION

A reference voltage generator and method generates a reference voltage for use by a digital signal receiver. A test signal is applied to an input of the receiver during a calibration mode while a reference voltage is applied to another input of the receiver. The magnitude of the reference voltage is varied while an output of the receiver is examined to determine if the test signal has been correctly coupled through the receiver. A reference voltage in the middle of the range of reference voltages that allowed the test signal to be coupled through the receiver is then used as a reference voltage during normal operation of the receiver.

DETAILED DESCRIPTION OF THE INVENTION

Figure 1:
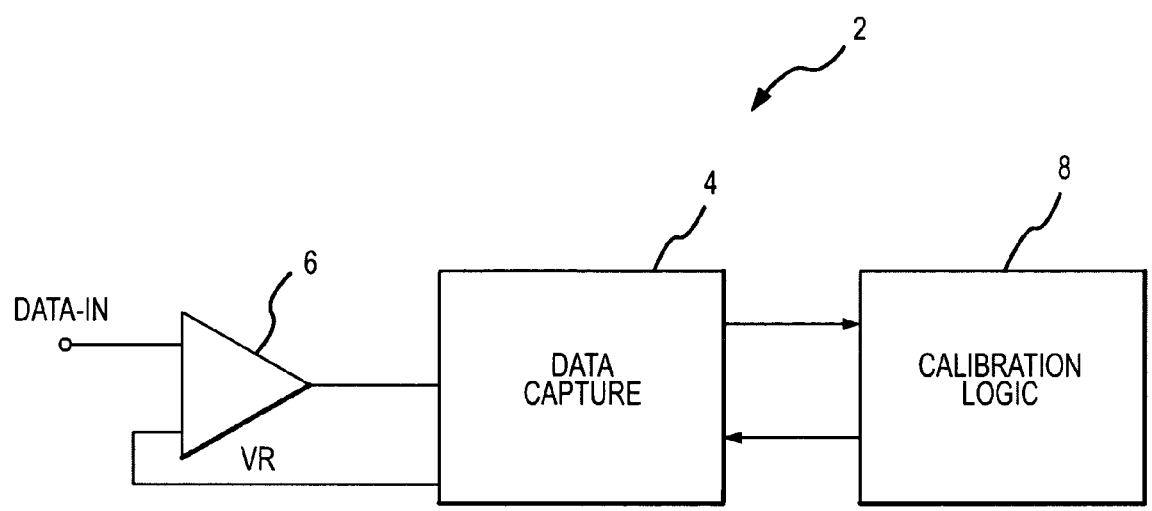
FIG. 1 is a block diagram of a system for generating a reference voltage for an input receiver according to one embodiment of the invention.

FIG. 1 is a block diagram of a system 2 for generating a reference voltage for a differential receiver of the type that may be used in memory devices. The reference voltage generating system 2 includes a data capture circuit 4 that generates a reference voltage $V_R$, which is coupled to one input of a differential receiver 6. The other input of the receiver 6 receives a digital signal. When the input signal has a voltage that is larger than the reference voltage $V_R$, the receiver 6 produces an output signal having one logic level. When the input signal has a voltage that is less than the reference voltage $V_R$, the receiver 6 produces an output signal having a different logic level. As explained in greater detail below, the data capture circuit 4 receives a data pattern from the receiver 6, and determines whether the received pattern matches a predetermined pattern, which indicates that the reference voltage $V_R$ is at a level that allows the receiver 6 to couple the data pattern from its input to its output. The data capture circuit 4 also generates the reference voltage $V_R$ from a corresponding binary value.

The data capture circuit 4 is coupled to calibration logic 8, which controls the operation of the data capture circuit 4 and selects a final reference voltage $V_R$ based on a range of reference voltages that allow the receiver 6 to couple the received digital pattern to its output. As described in greater detail below, the calibration logic 8 causes the data capture circuit 4 to incrementally vary the reference voltage $V_R$ over a substantial range, and to determine if the receiver 6 is able to couple the digital pattern to its output at each of the reference voltages. The calibration logic 8 then calculates a final reference voltage in substantially the middle of the range of reference voltages that allow the receiver 6 to pass the digital pattern.

Figure 2:
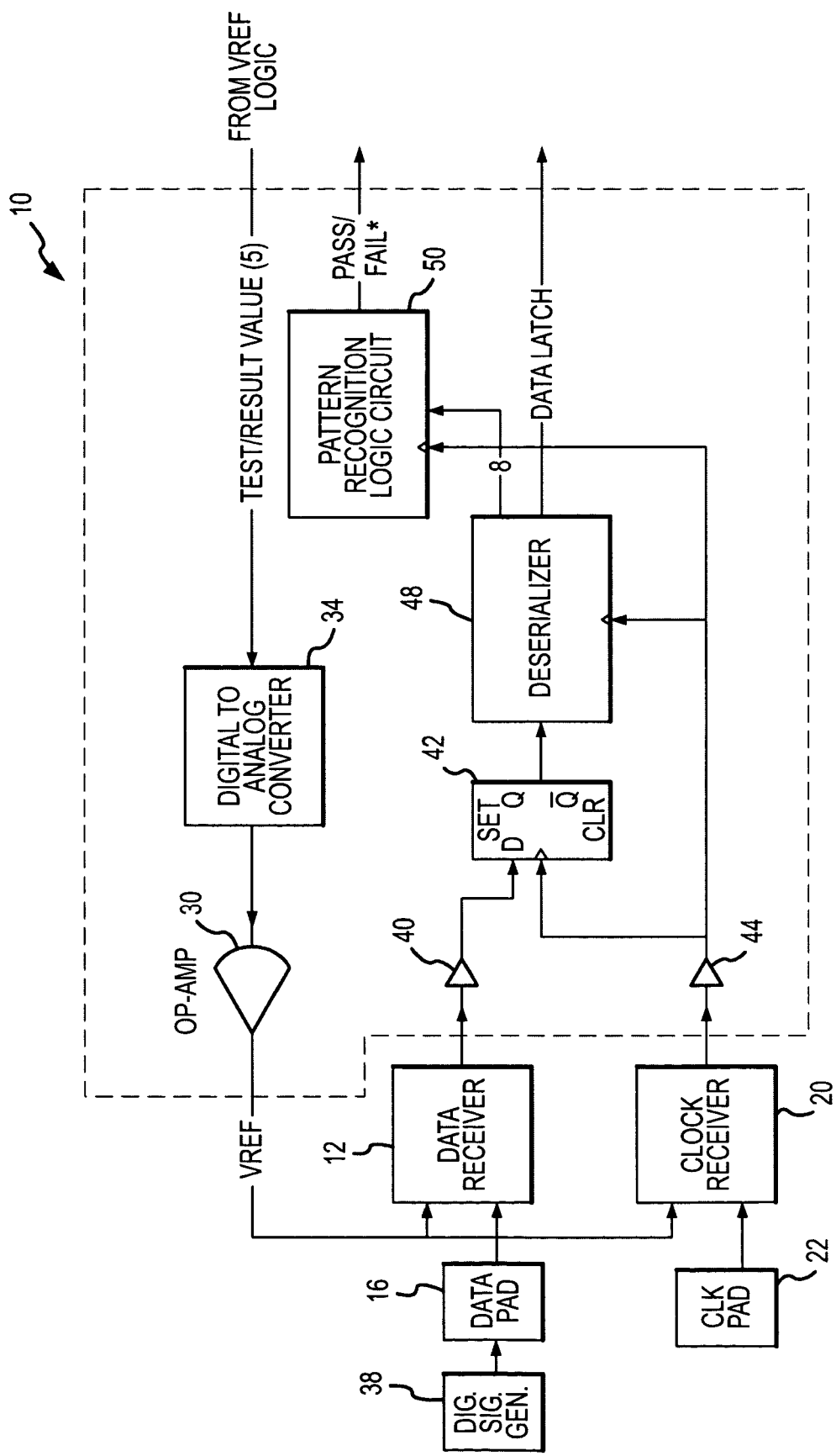
FIG. 2 is a block diagram of one example of a data capture portion for the reference voltage generator system of claim 1.

FIG. 2 is a block diagram of one example of a data capture circuit 10 that may be used as the data capture circuit 2 in FIG. 1. The data capture circuit 10 supplies a reference voltage $V_R$ to one input of a data receiver 12, which has a second input coupled to an externally accessible data pad 16. The reference voltage $V_R$ is also coupled to an input of a clock receiver 20, which also has a second input coupled to an externally accessible clock pad 22. Although the reference voltage $V_R$ is shown coupled to a single data receiver 12 in FIG. 1, it will be understood that it is normally connected to a large number of data receivers (not shown). Also, the reference voltage $V_R$ may be coupled to receivers to which digital signals other than data signals, such as command and address signals, are applied. Alternatively, the reference voltage $V_R$ may be independently set for each receiver coupled to an externally accessible pad.

With reference to FIG. 2, the reference voltage $V_R$ is generated by an operational amplifier 30 of conventional design which receives a corresponding voltage from a digital-to-analog converter 34. The operational amplifier 30 may boost the magnitude of the voltage from the digital-to-analog converter 34, or it may simply act as a voltage follower. In either case, the operational amplifier 30 has sufficient power to drive a large number of data receivers 12. The magnitude of the voltage generated by the digital-to-analog converter 34, and hence the magnitude of the reference voltage $V_R$, is controlled by a 5-bit test/result value. This test/result value is generated by the calibration logic 8, an example of which will be described with reference to FIG. 3.

The data capture circuit 10 operates in either of two modes: a calibration mode and a normal operation mode. In the calibration mode, a digital signal generator 58 successively applies a data test pattern to the data pad 16 as the magnitude of the reference voltage $V_R$ is varied. The data test pattern may be generated by suitable means, such as by a conventional digital signal generator 38. In the embodiment illustrated in FIG. 2, the data test pattern consists of 128 bits of serial data at each value of the reference voltage $V_R$ during the calibration mode. However, it will be understood that other calibration protocols may be used. The resulting data pattern at the output of the data receiver 12 may or may not correspond to the data test pattern depending upon the magnitude of the reference voltage $V_R$. The data pattern at the output of the data receiver 12 is coupled through a driver 40 to the data input of a capture flip-flop 42, which is clocked by the clock signal coupled through the clock receiver 20 and a driver 44. As each bit is captured by the capture flip-flop 42, it is coupled to a deserializer 48. If either the data receiver 12 when the clock receiver 20 fails to couple the data test pattern applied to the data pad 16 or the clock signal applied to the clock pad 22, the data captured by the flip-flop 42 will not match the data test pattern.

The deserializer 48 stores data bits captured by the flip-flop 42 8-bits at a time. The deserializer 48 converts the 8 serial data bits to 8 bits are parallel data, and applies the 8 parallel data bits to pattern recognition logic 50 of conventional design. The pattern recognition logic determines whether or not each 8-bit group of captured data pattern matched the data test pattern applied to the data pad 16, and generates a corresponding pass/fail* signal. The deserializer 48 also outputs a data latch pulse each time 8-bits are coupled to the pattern recognition logic 50. Therefore, the deserializer 48 will normally generate 16 data latch pulses for the 128 bits of data applied to the data pad 16.

The pass/fail*signal and the data latch signal are coupled to the calibration logic 8 (FIG. 1), an example of which will be described in greater detail with respect to FIG. 3. The calibration logic 8 generates a pass/result value, which is applied to the digital-to-analog converter 34.

Figure 3:
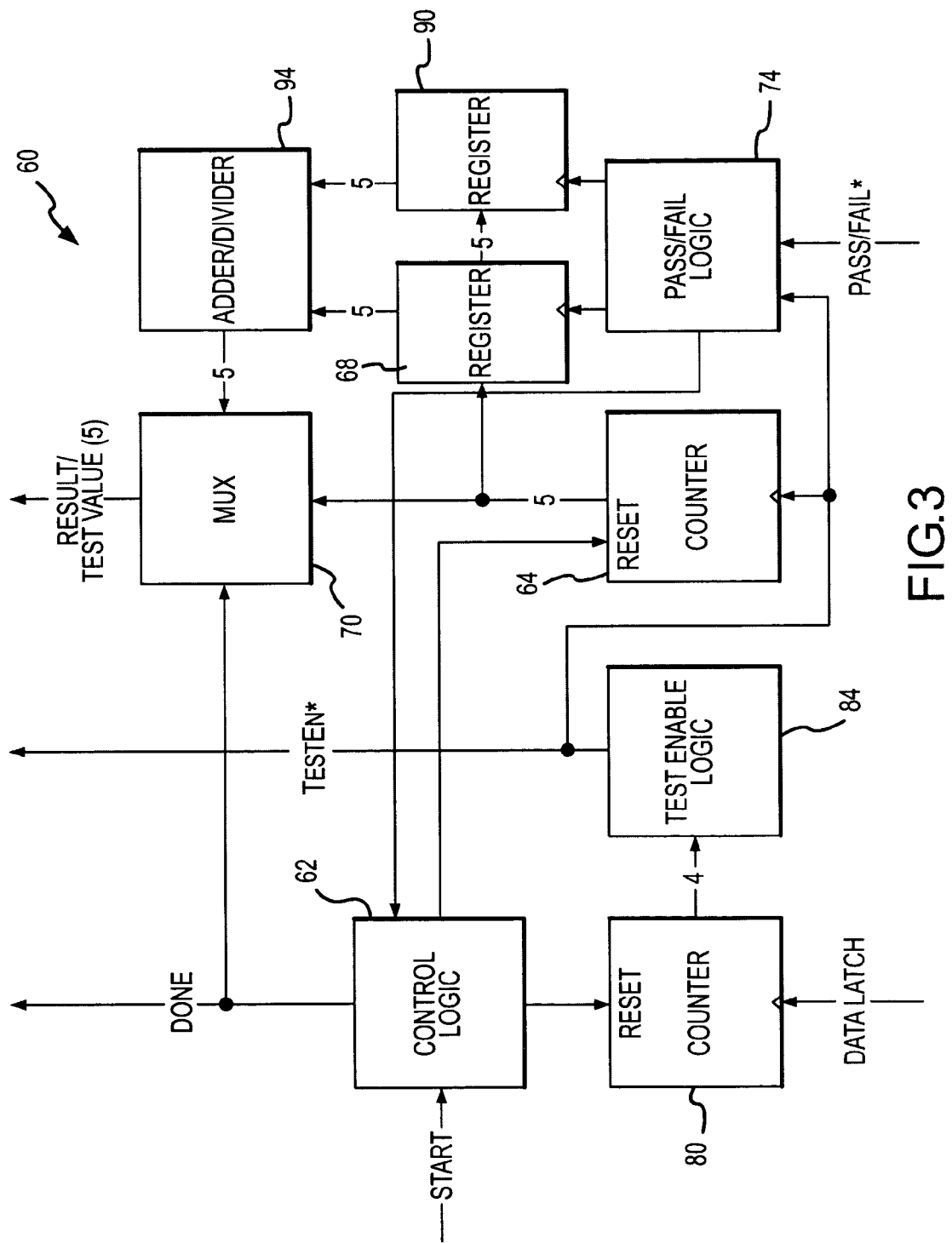
FIG. 3 is a block diagram of one example of reference voltage calibration logic for the reference voltage generator system of claim 1.

With reference to FIG. 3, one example of calibration logic 60 that may be used as the calibration logic 8 of FIG. 1 is shown in FIG. 3. The calibration mode is initiated by a Start signal, which is applied to control logic 62. The control logic 62 resets a counter 64 to cause the counter 64 to output a count corresponding to a minimum value of a reference voltage $V_R$ that will be used during the calibration mode. The count is captured by a first register 68 and it is also coupled to a multiplexer 70. In the calibration mode, the control logic 62 causes the multiplexer to couple the counter 64 to the digital-to-analog converter 34 so that the value of the reference voltage $V_R$ corresponds to the count from the counter 64.

As explained above, 128 bits of a data test pattern are then applied to the data pad 16, coupled through the data receiver 12, captured by the flip-flop 42 and output from the deserializer 48 to the pattern recognition logic 50, which generates a pass/fail* signal. The pass/fail* signal is coupled to pass/fail logic 74. Assuming that, as would be expected, the pass/fail* signal is initially low indicating a capture failure, the pass the logic 74 couples a clock signal to the register 68, which causes the register 68 to capture the count from the counter 64. As will be explained below, the count stored in the register 68 is underwritten with subsequent counts until four active high pass/fail* signals have been received by the pass/fail logic 74.

As explained above, a data latch pulse is generated by the deserializer 48 for each 8 bits of data captured by the flip-flop 42. Therefore, after 128 bits of the data test pattern have been captured, 16 data latch pulses have been applied to a counter 80. The counter 80 then outputs a 4-bit binary count "1111" indicative of the number "15," which is connected by test enable logic 84. The test enable logic 84 then drives an active low test enable TestEn* signal high, which increments the counter 64, thereby incrementally increasing the magnitude of the reference voltage $V_R$. The high test enable TestEn* signal disables the calibration circuitry for the next 16 data latch pulses, which are generated responsive to 128 bits of the clock signal. These 16 data latch pulses allow the reference voltage $V_R$ time to settle before a check is made to determine if the receiver 12 can pass data at the new level of the reference voltage $V_R$. After 128 additional clock pulses have been received, the resulting 16 data latch pulses again increment the counter 80 to 16, which is detected by the test enable logic 84. The test enable logic 84 then generates an active low TestEn* signal, which enables the pass/fail logic 74 to again process a pass/fail* signal.

The above-described procedure is repeated until a high pass/fail* signal is received by the pass fail logic 74. The pass fail logic 74 then refrains from applying a clock signal to the register 68 so that a count corresponding to the last failing reference voltage is retained in the register 68. The procedure is repeated 3 additional times and, if the pass/fail* signal remains high, the count is retained in the register 68 as the count corresponding to a low calibration reference voltage. If, one or more additional low pass/fail*signals are received by the pass/fail logic 74, the count corresponding to the last failing reference voltage $V_R$ is retained in the register 68 as the low calibration voltage.

After the low calibration voltage has been found and stored in the register 68, the above-described procedure is repeated until a low pass/fail* signal is again received by the pass/fail logic 74. The pass/fail logic 74 then outputs a clock signal to a register 90, which then stores the count from the counter 64 corresponding to the current reference voltage $V_R$ as the high calibration voltage. At this time, the register 90 will retain a count corresponding to the high calibration voltage, and the control logic 62 outputs an active high "Done" signal.

The count from the register 68 corresponding to the low calibration voltage and the count from the register 90 corresponding to the high calibration voltage are applied to an adder/divider 94, which sums the count and divides the result by two to provide a calibration count corresponding to a reference voltage $V_R$ that will be used in normal operation. The calibration count is coupled to the multiplexer 70. The active high "Done" signal causes the multiplexer 70 to couple the calibration count from the adder/divider 94 to the digital-to-analog converter 34. The digital-to-analog converter 34 then generates a reference voltage $V_R$ that is used in normal operation. Significantly, the above procedure adaptively causes a magnitude for the reference voltage $V_R$ to be selected that best allows the data receiver 12 to couple data to the capture flip-flop 42.

Figure 4:
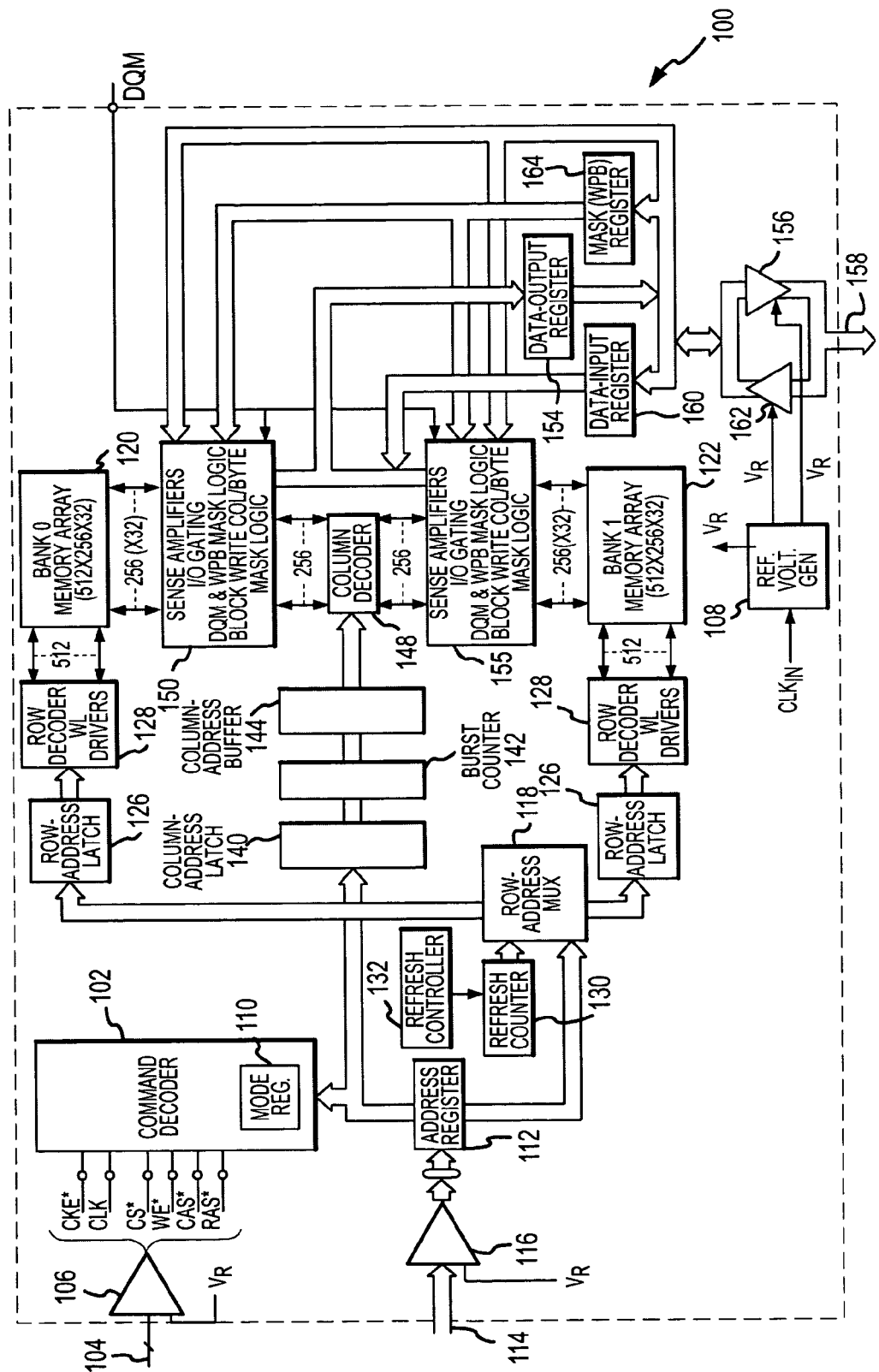
FIG. 4 is a block diagram of a synchronous dynamic random access memory having receivers that can utilize reference voltage generators according to various embodiments of the invention.

FIG. 4 is a block diagram of a conventional synchronous dynamic random access memory ("SDRAM") 100 having receivers to which command, address and data signals are coupled and that can utilize a reference voltage generator according to various embodiments of the invention. However, it will be understood that reference voltage generator according to other embodiments of the present invention can also be used in other types of memory devices or with other types of digital circuits.

The operation of the SDRAM 100 is controlled by a command decoder 102 responsive to high-level command signals received on a control bus 104. These high level command signals, which are typically generated by a memory controller (not shown in FIG. 4), are a clock enable signal CKE*, a clock signal CLK, a chip select signal CS*, a write enable signal WE*, a row address strobe signal RAS*, a column address strobe signal CAS*, and a data mask signal DM, in which the "*" designates the signal as active low. The command decoder 102 includes a plurality of command receivers, collectively designated by reference numeral 106, through which the high-level command signals are coupled. As previously explained, the command receivers 106 receive a reference voltage $V_R$ that is optimally set by a reference voltage generator 108 during a calibration mode. The command decoder 102 generates a sequence of command signals responsive to the high level command signals to carry out the function (e.g., a read or a write) designated by each of the high level command signals. These command signals, and the manner in which they accomplish their respective functions, are conventional. Therefore, in the interest of brevity, a further explanation of these command signals will be omitted. The command decoder 102 may also include a mode register 110 that can be programmed to control the operating mode of the SDRAM 100.

The SDRAM 100 includes an address register 112 that receives row addresses and column addresses through an address bus 114. The address bus 114 is generally coupled to a memory controller (not shown in FIG. 4). The address register 112 includes a plurality of address receivers, collectively designated by reference numeral 116. A reference voltage $V_R$ from the reference voltage generator 108 is coupled to each of the address receivers 116. Alternatively, a separate reference voltage generator (not shown) may be used to supply a reference voltage $V_R$ to the address receivers 116, or a separate reference voltage generator (not shown) may be used to supply a reference voltage $V_R$ to each of the address receivers 116 as well as each of the command receivers 106. A row address is generally first received by the address register 112 and applied to a row address multiplexer 118. The row address multiplexer 118 couples the row address to a number of components associated with either of two memory banks 120, 122 depending upon the state of a bank address bit forming part of the row address. Associated with each of the memory banks 120, 122 is a respective row address latch 126, which stores the row address, and a row decoder 128, which decodes the row address and applies corresponding signals to one of the arrays 120 or 122. The row address multiplexer 118 also couples row addresses to the row address latches 126 for the purpose of refreshing the memory cells in the arrays 120, 122. The row addresses are generated for refresh purposes by a refresh counter 130, which is controlled by a refresh controller 132. The refresh controller 132 is, in turn, controlled by the command decoder 102.

After the row address has been applied to the address register 112 and stored in one of the row address latches 126, a column address is applied to the address register 112. The address register 112 couples the column address to a column address latch 140. Depending on the operating mode of the SDRAM 100, the column address is either coupled through a burst counter 142 to a column address buffer 144, or to the burst counter 142 which applies a sequence of column addresses to the column address buffer 144 starting at the column address output by the address register 112. In either case, the column address buffer 144 applies a column address to a column decoder 148, which applies various column signals to corresponding sense amplifiers and associated column circuitry 150, 152 for one of the respective arrays 120, 122.

Data to be read from one of the arrays 120, 122 is coupled to the column circuitry 150, 152 for one of the arrays 120, 122, respectively. The data is then coupled to a data output register 154, which includes a set of read data receivers collectively shown as receiver 156. The data output register 156 applies bit of the data to respective conductors of a data bus 158 through the read data receivers 156. Data to be written to one of the arrays 120, 122 are coupled from the data bus 158 through a data input register 160. The data input register 160 includes a plurality of write data receivers 162 that couple a respective bit of write data from the data bus 158 to internal circuitry in the data input register 160. A reference voltage $V_R$ from the reference voltage generator 108 is coupled to each of the read data receivers 156 and the write data receivers 162. Alternatively, a separate reference voltage generator (not shown) may be used to supply a reference voltage $V_R$ to all of the read data receivers 156 and the write data receivers 162, or a separate reference voltage generator (not shown) may be used to supply a reference voltage $V_R$ to each of the read data receivers 156 and the write data receivers 162. In any case, the write data from the write data receivers 162 are coupled to the column circuitry 150, 152 where they are transferred to one of the arrays 120, 122, respectively. A mask register 164 responds to a data mask DM signal to selectively alter the flow of data into and out of the column circuitry 150, 152, such as by selectively masking data to be read from the arrays 120, 122.

Figure 5:
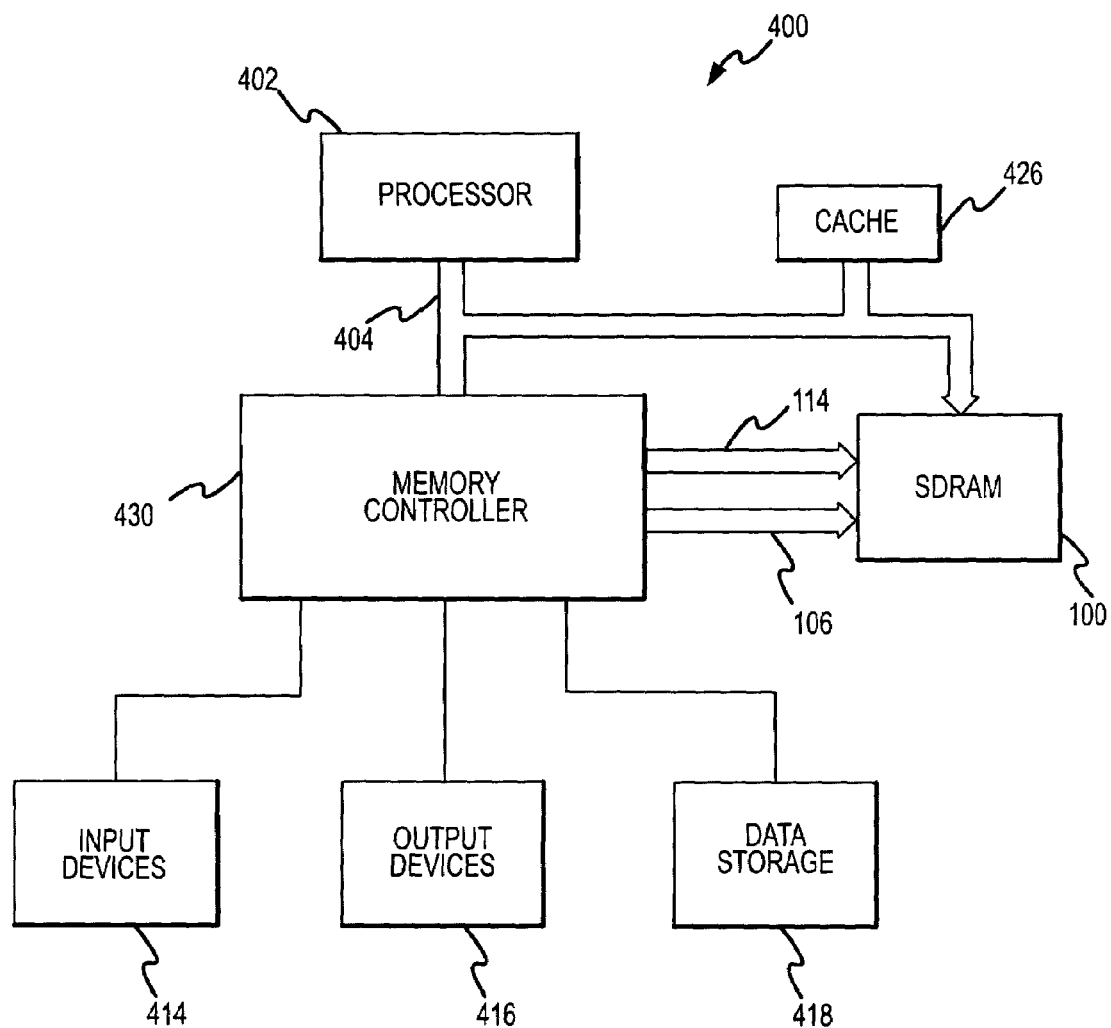
FIG. 5 is a block diagram of a computer system using the synchronous dynamic random access memory of FIG. 4.

FIG. 5 shows an embodiment of a computer system 400 that may use the SDRAM 100 or some other memory device that contains the reference voltage generator 108. The computer system 400 includes a processor 402 for performing various computing functions, such as executing specific software to perform specific calculations or tasks. The processor 402 includes a processor bus 404 that normally includes an address bus, a control bus, and a data bus. In addition, the computer system 400 includes one or more input devices 414, such as a keyboard or a mouse, coupled to the processor 402 to allow an operator to interface with the computer system 400. Typically, the computer system 400 also includes one or more output devices 416 coupled to the processor 402, such output devices typically being a printer or a video terminal. One or more data storage devices 418 are also typically coupled to the processor 402 to store data or retrieve data from external storage media (not shown). Examples of typical storage devices 418 include hard and floppy disks, tape cassettes, and compact disk read-only memories (CD-ROMs). The processor 402 is also typically coupled to a cache memory 426, which is usually static random access memory ("SRAM") and to the SDRAM 100 through a memory controller 430. The memory controller 430 includes an address bus coupled to the address bus 114 (FIG. 4) to couple row addresses and column addresses to the SDRAM 100. The memory controller 430 also includes a control bus that couples command signals to the control bus 106 of the SDRAM 100. The external data bus 158 of the SDRAM 100 is coupled to the data bus of the processor 402, either directly or through the memory controller 430.

From the foregoing it will be appreciated that, although specific embodiments of the invention have been described herein for purposes of illustration, it will be understood by one skilled in the art that various modifications may be made without deviating from the spirit and scope of the invention. For example, although the embodiments of the invention are primarily shown as generating reference voltages only for data signal receivers, it will be understood that they may also be used for generating reference voltages for other signals, such as command signals and address signals, as shown in FIG. 4. Accordingly, the invention is not limited except as by the appended claims.

What is claimed is:

1. A system for setting a reference voltage applied to a first input of a differential receiver having a second input for receiving a digital signal, the system comprising:
   a reference voltage generator providing a reference voltage coupled to the first input of the receiver, the reference voltage generator having an adjustably selectable magnitude;
   a test generator for generating a digital test signal coupled to the second input of the receiver, the digital test signal having predetermined characteristics;
   a data analysis logic coupled to an output of the receiver, the data analysis logic analyzing an output signal from the receiver to determine if the test signal is properly being coupled through the receiver, the data analysis logic comprising a pattern recognition logic coupled to receive the output signal from the receiver, the pattern recognition logic being operable to determine if the output signal has the predetermined characteristics, the data analysis logic further comprising a flip-flop having a data input coupled to receive the output signal from the receiver and a clock input coupled to receive a clock signal, the flip-flop capturing the output signal from the receiver responsive to the clock signal, the pattern recognition logic being coupled to an output of the flip-flop; and
   a calibration logic coupled to the reference voltage generator and the data analysis logic, the calibration logic selecting a final value for the reference voltage based on the analysis of the output signal from the receiver, the calibration logic causing the reference voltage generator to couple the final value of the reference voltage to the first input of the receiver.

2. The system of claim 1 wherein the reference voltage generator comprises a digital-to-analog converter having an analog output at which the reference voltage is generated, the magnitude of the reference voltage corresponding to a digital signal coupled to digital input of the digital-to-analog converter.

3. The system of claim 2 wherein the calibration logic comprises a counter incremented each time the data analysis logic has analyzed the output signal from the receiver at each reference voltage, the counter generating a digital count value that is coupled to the digital input of the digital-to-analog converter.

4. The system of claim 1 wherein the data analysis logic further comprises a deserializer coupled to the output of the flip-flop, the deserializer receiving a plurality of bits of serial data from the flip-flop, converting the serial data to parallel data, and then coupling the parallel data to the pattern recognition logic.

5. The system of claim 4 wherein the deserializer is further operable to generate a pulse each time the deserializer coupled parallel data to the pattern recognition logic.

6. The system of claim 5 wherein the calibration logic comprises:
   a counter having a clock input that is coupled to receive the pulses from the deserializer, the counter generating a digital count value; and
   a test enable logic coupled to receive the digital count value from the counter, the test enable logic alternately generating a test enable signal that is alternately active and inactive each time a predetermined number of pulses from the deserializer have been received by the counter, the active test enable signal enabling the analysis logic to analyze the output signal from the receiver to determine if the test signal is properly being coupled through the receiver.

7. The system of claim 6 wherein the calibration logic further comprises a counter incremented by the test enable signal, the counter generating a count value that is coupled to the reference voltage generator to select the magnitude of the reference voltage.

8. The system of claim 1 wherein the calibration logic comprises:
   a first register operable to store a first digital value indicative of the magnitude of the reference voltage at a low end of a range of reference voltages that allow the differential receiver to pass the digital signal applied to its second input;
   a second register operable to store a second digital value indicative of the magnitude of the reference voltage at a high end of a range of reference voltages that allow the differential receiver to pass the digital signal applied to its second input; and a calculation circuit coupled to receive the first and second digital values from the first and second registers, respectively, the calculation circuit being operable to calculate a third digital value indicative of the final value of the reference voltage.

9. A memory device, comprising:
a command decoder receiving memory command signals through externally accessible command input terminals, the command decoder generating memory control signals responsive to predetermined combinations of the command signals;
an address decoder receiving address signals through externally accessible address input terminals, the address decoder generating row and column addressing signals responsive to the address signals;
a memory array from which data are read and to which data are written at locations corresponding the address signals responsive to the memory control signals;
a data path extending between a plurality of externally accessible data bus terminals and the memory array for coupling read data signals from the memory array and write data signals to the memory array, the data path comprising a differential receiver having a first input coupled to each of the data bus terminals through which the write data signals are coupled; and
a reference voltage system coupled to a second input of each of the differential receivers, the reference voltage system comprising:
a reference voltage generator providing a reference voltage coupled to the second input of the differential receiver, the reference voltage generator having an adjustably selectable magnitude;
a test generator for generating a digital test signal coupled to the first input of the receiver, the digital test signal having predetermined characteristics;
a data analysis logic coupled to an output of the receiver, the data analysis logic analyzing an output signal from the receiver to determine if the test signal is properly being coupled through the receiver, the data analysis logic comprising a pattern recognition logic coupled to receive the output signal from the receiver, the pattern recognition logic being operable to determine if the output signal has the predetermined characteristics; and
a calibration logic coupled to the reference voltage generator and the data analysis logic, the calibration logic selecting a final value for the reference voltage based on the analysis of the output signal from the receiver, the calibration logic causing the reference voltage generator to couple the final value of the reference voltage to the first input of the receiver.

10. The memory device of claim 9 wherein the reference voltage generator comprises a digital-to-analog converter having an analog output at which the reference voltage is generated, the magnitude of the reference voltage corresponding to a digital signal coupled to digital input of the digital-to-analog converter.

11. The memory device of claim 10 wherein the calibration logic comprises a counter incremented each time the data analysis logic has analyzed the output signal from the receiver at each reference voltage, the counter generating a digital count value that is coupled to the digital input of the digital-to-analog converter.

12. The memory device of claim 9 wherein the data analysis logic further comprises a flip-flop having a data input coupled to receive the output signal from the receiver and a clock input coupled to receive a clock signal, the flip-flop capturing the output signal from the receiver responsive to the clock signal, the pattern recognition logic being coupled to an output of the flip-flop.

13. The memory device of claim 12 wherein the data analysis logic further comprises a deserializer coupled to the output of the flip-flop, the deserializer receiving a plurality of bits of serial data from the flip-flop, converting the serial data to parallel data, and then coupling the parallel data to the pattern recognition logic.

14. The memory device of claim 13 wherein the deserializer is further operable to generate a pulse each time the deserializer coupled parallel data to the pattern recognition logic.

15. The memory device of claim 14 wherein the calibration logic comprises:
a counter having a clock input that is coupled to receive the pulses from the deserializer, the counter generating a digital count value; and
a test enable logic coupled to receive the digital count value from the counter, the test enable logic alternately generating a test enable signal that is alternately active and inactive each time a predetermined number of pulses from the deserializer have been received by the counter, the active test enable signal enabling the analysis logic to analyze the output signal from the receiver to determine if the test signal is properly being coupled through the receiver.

16. The memory device of claim 15 wherein the calibration logic further comprises a counter incremented by the test enable signal, the counter generating a count value that is coupled to the reference voltage generator to select the magnitude of the reference voltage.

17. The memory device of claim 9 wherein the calibration logic comprises:
a first register operable to store a first digital value indicative of the magnitude of the reference voltage at a low end of a range of reference voltages that allow the differential receiver to pass the digital signal applied to its second input;
a second register operable to store a second digital value indicative of the magnitude of the reference voltage at a high end of a range of reference voltages that allow the differential receiver to pass the digital signal applied to its second input; and
a calculation circuit coupled to receive the first and second digital values from the first and second registers, respectively, the calculation circuit being operable to calculate a third digital value indicative of the final value of the reference voltage.

18. The memory device of claim 9 wherein the memory device comprises a dynamic random access memory device.

19. A computer system, comprising:
an integrated circuit processor having a plurality of externally accessible terminals coupled to a processor bus;
an input device coupled to the processor through the processor bus adapted to allow data to be entered into the computer system;
an output device coupled to the processor through the processor bus adapted to allow data to be output from the computer system; and
a dynamic random access memory coupled to a processor bus, the dynamic random access memory comprising:
a command decoder receiving memory command signals through externally accessible command input terminals, the command decoder generating memory control signals responsive to predetermined combinations of the command signals;

an address decoder receiving address signals through externally accessible address input terminals, the address decoder generating row and column addressing signals responsive to the address signals;

a memory array from which data are read and to which data are written at locations corresponding the address signals responsive to the memory control signals;

a data path extending between a plurality of externally accessible data bus terminals and the memory array for coupling read data signals from the memory array and write data signals to the memory array, the data path comprising a differential receiver having a first input coupled to each of the data bus terminals through which the write data signals are coupled, the data analysis logic comprising a pattern recognition logic coupled to receive the output signal from the receiver, the pattern recognition logic being operable to determine if the output signal has the predetermined characteristics; and a reference voltage system coupled to a second input of each of the differential receivers, the reference voltage system comprising:

a reference voltage generator providing a reference voltage coupled to the second input of the differential receiver, the reference voltage generator having an adjustably selectable magnitude;

a test generator for generating a digital test signal coupled to the first input of the receiver, the digital test signal having predetermined characteristics;

a data analysis logic coupled to an output of the receiver, the data analysis logic analyzing an output signal from the receiver to determine if the test signal is properly being coupled through the receiver; and a calibration logic coupled to the reference voltage generator and the data analysis logic, the calibration logic selecting a final value for the reference voltage based on the analysis of the output signal from the receiver, the calibration logic causing the reference voltage generator to couple the final value of the reference voltage to the first input of the receiver.

20. The computer system of claim 19 wherein the reference voltage generator comprises a digital-to-analog converter having an analog output at which the reference voltage is generated, the magnitude of the reference voltage corresponding to a digital signal coupled to digital input of the digital-to-analog converter.

21. The computer system of claim 20 wherein the calibration logic comprises a counter incremented each time the data analysis logic has analyzed the output signal from the receiver at each reference voltage, the counter generating a digital count value that is coupled to the digital input of the digital-to-analog converter.

22. The computer system of claim 19 wherein the data analysis logic further comprises a flip-flop having a data input coupled to receive the output signal from the receiver and a clock input coupled to receive a clock signal, the flip-flop capturing the output signal from the receiver responsive to the clock signal, the pattern recognition logic being coupled to an output of the flip-flop.

23. The computer system of claim 22 wherein the data analysis logic further comprises a deserializer coupled to the output of the flip-flop, the deserializer receiving a plurality of bits of serial data from the flip-flop, converting the serial data to parallel data, and then coupling the parallel data to the pattern recognition logic.

24. The computer system of claim 23 wherein the deserializer is further operable to generate a pulse each time the deserializer coupled parallel data to the pattern recognition logic.

25. The computer system of claim 24 wherein the calibration logic comprises:

a counter having a clock input that is coupled to receive the pulses from the deserializer, the counter generating a digital count value; and a test enable logic coupled to receive the digital count value from the counter, the test enable logic alternately generating a test enable signal that is alternately active and inactive each time a predetermined number of pulses from the deserializer have been received by the counter, the active test enable signal enabling the analysis logic to analyze the output signal from the receiver to determine if the test signal is properly being coupled through the receiver.

26. The computer system of claim 25 wherein the calibration logic further comprises a counter incremented by the test enable signal, the counter generating a count value that is coupled to the reference voltage generator to select the magnitude of the reference voltage.

27. The computer system of claim 19 wherein the calibration logic comprises:

a first register operable to store a first digital value indicative of the magnitude of the reference voltage at a low end of a range of reference voltages that allow the differential receiver to pass the digital signal applied to its second input;

a second register operable to store a second digital value indicative of the magnitude of the reference voltage at a high end of a range of reference voltages that allow the differential receiver to pass the digital signal applied to its second input; and a calculation circuit coupled to receive the first and second digital values from the first and second registers, respectively, the calculation circuit being operable to calculate a third digital value indicative of the final value of the reference voltage.

28. The computer system of claim 19 wherein the memory device comprises a dynamic random access memory device.

* * * * *

UNITED STATES PATENT AND TRADEMARK OFFICE
CERTIFICATE OF CORRECTION

PATENT NO. : 7,577,212 B2  
APPLICATION NO. : 10/930543  
DATED : August 18, 2009  
INVENTOR(S) : Keeth et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1388 days.

Signed and Sealed this

Seventh Day of September, 2010

David J. Kappos  
*Director of the United States Patent and Trademark Office*